(12) United States Patent
Radermacher et al.

(10) Patent No.: US 10,976,039 B2
(45) Date of Patent: Apr. 13, 2021

(54) LIGHTING DEVICE WITH MOTION SENSOR

(71) Applicant: SIGNIFY HOLDING B.V., Eindhoven (NL)

(72) Inventors: Harald Josef Gunther Radermacher, Eindhoven (NL); Rifat Ata Mustafa Hikmet, Eindhoven (NL); Anteneh Alemu Abbo, Eindhoven (NL); Hongming Yang, Eindhoven (NL); Johannes Petrus Wilhelmus Baaijens, Eindhoven (NL); Dave Willem Van Goor, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/958,938

(22) PCT Filed: Dec. 18, 2018

(86) PCT No.: PCT/EP2018/085369
§ 371 (c)(1),
(2) Date: Jun. 29, 2020

(87) PCT Pub. No.: WO2019/134818
PCT Pub. Date: Jul. 11, 2019

(65) Prior Publication Data
US 2020/0340658 A1     Oct. 29, 2020

(30) Foreign Application Priority Data

Jan. 2, 2018  (EP) .................................... 18150013

(51) Int. Cl.
*F21V 23/04*    (2006.01)
*F21V 3/06*     (2018.01)
(Continued)

(52) U.S. Cl.
CPC .......... *F21V 23/0471* (2013.01); *F21V 3/062* (2018.02); *F21V 9/04* (2013.01);
(Continued)

(58) Field of Classification Search
CPC .............................. G01J 5/0022; G01J 5/0025
See application file for complete search history.

(56) References Cited

U.S. PATENT DOCUMENTS

| 5,973,594 A | 10/1999 | Baldwin et al. |
| 8,901,496 B2 | 12/2014 | Aurongzeb et al. |

(Continued)

*Primary Examiner* — Alan B Cariaso

(57) ABSTRACT

Provided is a lighting device including a light source for emitting light, a sensor configured to detect infrared radiation from a plurality of locations along a path in the field of view of the sensor, at least one attenuation element arranged between at least one location of the plurality of locations and the sensor so as to attenuate or block infrared radiation emitted from the at least one location before it reaches the sensor, and a controller. The at least one attenuation element is further arranged in relation to the field of view of the sensor for the signal output from the sensor to indicate, when an occupant is moving along the path, a direction of movement of the occupant along the path. The controller is arranged to control the light source based on the direction of movement of the occupant, and a cover plate is arranged between the at least one location of said plurality of locations and the sensor, and also arranged between the at least one location and the light source, wherein the cover plate is transparent or translucent to said visible light, wherein the at least one attenuation element forms part of the cover plate, and wherein outside, or away from, the attenuation element, the cover plate is at least partly transparent to infrared radiation.

12 Claims, 3 Drawing Sheets

(51) Int. Cl.
  *F21V 23/00*   (2015.01)
  *G01J 5/00*    (2006.01)
  *F21V 9/04*    (2018.01)
  *F21Y 115/10*  (2016.01)

(52) U.S. Cl.
  CPC .......... *F21V 23/003* (2013.01); *G01J 5/0022* (2013.01); *F21Y 2115/10* (2016.08)

(56) References Cited

U.S. PATENT DOCUMENTS

| | | |
|---|---|---|
| 9,297,643 B2 | 3/2016 | Vissenberg et al. |
| 2008/0001071 A1 | 1/2008 | Lee et al. |
| 2010/0238030 A1 | 9/2010 | Shafer et al. |
| 2012/0306377 A1 | 12/2012 | Igaki et al. |
| 2013/0049598 A1* | 2/2013 | Nagashima ............ F21K 9/278 315/113 |
| 2016/0013223 A1 | 1/2016 | Chang et al. |
| 2016/0369991 A1 | 12/2016 | Lim et al. |
| 2018/0026173 A1* | 1/2018 | Fujiwara ................. G01J 5/34 250/338.3 |
| 2019/0059142 A1* | 2/2019 | Chen ................... H05B 47/105 |

* cited by examiner

LIGHTING DEVICE WITH MOTION SENSOR

CROSS-REFERENCE TO PRIOR APPLICATIONS

This application is the U.S. National Phase application under 35 U.S.C. § 371 of International Application No. PCT/EP2018/085369, filed on Dec. 18, 2018, which claims the benefit of European Patent Application No. 18150013.3, filed on Jan. 2, 2018. These applications are hereby incorporated by reference herein.

TECHNICAL FIELD

The present disclosure relates to the field of lighting devices. In particular, the present disclosure relates to the field of lighting devices utilizing occupancy sensors to control their light sources.

BACKGROUND

Lighting devices (such as for example luminaires, light fittings or light fixtures) are commonly used to provide illumination of e.g. rooms or outdoor areas. The most basic lighting devices may be turned on and off by using e.g. a switch, such that a user may turn the lighting device on when illumination is needed, and such that the user may turn the lighting device off when illumination is no longer needed. In some situations, the user itself may not be able to turn the lighting device on and off as required. In other situations, the user may simply forget to turn the lighting device off when it is no longer required, leading to unnecessary costs in terms of electricity and maintenance.

To overcome these problems, lighting devices may be connected to occupancy sensors which may detect the presence of an occupant within a certain area by detecting infrared radiation emitted by such an occupant. Using a controller, the lighting devices may then be switched on and off accordingly depending on whether the occupancy sensor has detected the presence of an occupant or not.

The use of occupancy sensors together with lighting devices may, however, lead to an increased cost of production, and increasing demands on both user experience and cost of operation may still not be met. There is therefore a need for improved lighting devices.

SUMMARY OF THE INVENTION

The present disclosure seeks to at least partially fulfil the above requirements. To achieve this, a lighting device as defined by the independent claims is provided. Further embodiments are provided in the dependent claims. The present disclosure also provides a lighting arrangement including at least two lighting devices communicatively coupled to each other.

According to a first aspect of the present disclosure, a lighting device is provided. The lighting device includes a light source for emitting visible light. The lighting device further includes a sensor which is configured to detect infrared radiation from a plurality of locations along a path in a field of view of the sensor. The sensor is further configured to output a signal indicative of a presence of an occupant along the path.

The lighting device further includes at least one attenuation element. The at least one attenuation element is arranged between at least one location of the plurality of locations and the sensor. The at least one attenuation element is arranged between the at least one location of the plurality of locations and the sensor so as to attenuate or block infrared radiation from the at least one location before it reaches the sensor. The attenuation element is further arranged in relation to the field of view (of the sensor) for the signal output from the sensor to indicate, when an occupant is moving along the path, a direction of a movement of the occupant along the path. The lighting device further includes a controller arranged to receive the signal output from the sensor and to control the light source based on the direction of movement of the occupant.

The lighting device further includes a cover plate arranged between the at least one location of said plurality of locations and the sensor, and also arranged between the at least one location and the light source. The cover plate is transparent or translucent to said visible light. The at least one attenuation element forms part of the cover plate. Outside, or away from, the attenuation element, the cover plate is at least partly transparent to infrared radiation.

The light source is arranged to emit visible light, and the lighting device may be utilized to illuminate e.g. a room or an outdoor space. At the same time, the sensor may be used to detect infrared radiation which may be emitted from an occupant within the field of view of the sensor. An occupant may for example be a person walking around along a path in a room in which the lighting device is installed. By using the at least one attenuation element, the lighting device may determine not only that an occupant is present in e.g. the room in which the lighting device is installed, but also determine in what direction the occupant is moving using only a single sensor. The direction may be defined relative to the path, and the path may be defined relative to the field of view of the sensor of the lighting device. The controller may then control the light source based not only on whether an occupant is present or not, but also based on the direction in which the occupant is moving. This may provide for a more flexible lighting device, which may for example provide an increased user experience and/or a more cost efficient way of providing necessary illumination of e.g. a room or an outdoor space in which the lighting device is arranged.

As used herein, "a path" does not exclude also multiple paths. The sensor may cover a plurality of paths within its field of view. Multiple paths may for example all follow substantially a same path, or multiple paths may be distinct and, for example, start and end at distinct locations within the field of view of the sensor.

In some embodiments, the lighting device may further include a lens for directing infrared light towards the sensor. Using a lens, the field of view of the sensor may be enlarged, such that the sensor may detect incoming infrared radiation from a larger range of angles and/or directions. The at least one attenuation element may form part of the lens.

In some embodiments, the at least one attenuation element may be a heat-stenciled element, a press-on-molded element, a 3D-printed element (using e.g. fused deposition modeling and/or ink jetting), or a dispensed element. The at least one attenuation element may for example be manufactured by using a heated stencil, a press-on-mold, a 3D-printer and/or a dispenser. If the attenuation element for example is to form part of a lens, the at least one attenuation element may be manufactured by modifying a standard lens. A stencil may for example be heated and used to change the optical properties of the lens in the regions where the at least one attenuation element will be, located such that these regions will block, or at least have an increased attenuation of, infrared light/radiation, especially in the range 7-14 μm.

The lighting device includes a cover plate. The cover plate is arranged between the at least one location of the plurality of locations and the sensor. The at least one attenuation element forms part of the cover plate. The cover plate may for example protect the sensor from ambient environment conditions. The cover plate is transparent (or at least translucent) to visible light, especially in the range 400-700 nm. Outside, or away from, the attenuation element, the cover plate is transparent to infrared light/radiation, especially in all or part of the range 7-14 µm.

Herein, "visible light" may be defined as light falling within the range 400-700 nm.

Herein, "infrared radiation/light" may be defined as radiation/light falling within the range 7-14 µm.

The cover plate is arranged between the at least one location and the light source. The cover plate is transparent or translucent to visible light (e.g. visible light emitted by the light source). The cover plate may protect both the sensor and the light source from ambient environment conditions, while still allowing for light emitted by the light source (e.g. visible light) to pass therethrough either unaffected or with some diffusion. The at least one attenuation element may be incorporated into the cover plate such that it is not visible to the human eye, while still being able to block or attenuate infrared radiation. At least part of the cover plate is at least partly transparent to infrared radiation/light (e.g. the infrared radiation emitted by the occupant) in all or part of the range 7-14 µm.

In some embodiments, the cover plate may be at least partly made of polyethylene.

In some embodiments, the at least one attenuation element may comprise a material selected from polymers or polymerizable molecules. Examples may include e.g. acrylates and/or epoxides. The material of the at least one attenuation element may have at least one of the following functional groups: an alcohol group; an ether group (980-1250 $cm^{-1}$); a vinyl group; a double bond alkene (=C—H, bending, 675-1000 $cm^{-1}$); an amine group (C—N bond); an ester group (1035-1300 $cm^1$); an alkyl halide group (C—F, stretch, 1000-1400 $cm^{-1}$; C—Cl, stretch 600-800 $cm^{-1}$; C—Br, stretch, 500-600 $cm^{-1}$; C—I, stretch 500 $cm^{-1}$); aromatic rings, and a cyano/nitrile group.

In some embodiments, the at least one attenuation element may include a material selected from the group of: polyesters (e.g. polycarbonate or polyethylene terephthalate); polyacrylates [e.g. poly(methyl methacrylate), PMMA]; vinyl polymers (e.g. polystyrene or polyvinyl alcohol), and acrylonitrile butadiene styrene (ABS).

In some embodiments, the at least one attenuation element may be produced by using reactive monomers, such as for example Bisphenol-A diacrylate, acrylic acid, hexanediol diacrylate, Bisphenol-A epoxy, which may be printed and then cured by e.g. ultraviolet light or heat.

In some embodiments, the at least one attenuation element may be arranged asymmetrically with respect to the field of view of the sensor. The sensor may for example have a main optical axis at which its field of view is centered. The at least one attenuation element(s) may be arranged in an asymmetrical manner relative to the main optical axis of the sensor. If, for example, two attenuation elements are provided, an asymmetrical arrangement of these elements may include arranging them at different distances to the main optical axis of the sensor. Arranging the at least one attenuation element asymmetrically with respect to the field of view of the sensor may further improve the ability to determine the direction of movement of the occupant along the path.

In some embodiments, the light source may include a light emitting diode (LED). LEDs may provide a power efficient way of illuminating e.g. a room or an outdoor space.

In some embodiments, the controller may be configured to set or retain the light source in an on-state if it is detected that the occupant moves along the path in a first direction, and/or to set or retain the light source in an off-state if it is detected that the occupant moves along the path in a second direction opposite to the first direction. If, for example, the path bridges two regions (such as e.g. two rooms, or e.g. a room and a hallway leading to/from that room), it may be assumed that a movement of the occupant in the first direction corresponds to the occupant entering one of the regions and that illumination of this region will be required. It may also be assumed that a movement of the occupant in the second direction corresponds to the occupant leaving said region, and that illumination of said region is no longer required. The controller may control the light source accordingly, providing a more improved illumination process both in terms of user experience and cost.

In some embodiments, the controller may be configured to set or retain the light source in an off-state after a lapse of a first time period starting when it is detected that the occupant moves along the path in a first direction, and/or to set or retain the light source in an off-state after a lapse of a second time period starting when it is detected that the occupant moves along the path in a second direction opposite to the first direction. The second time period may for example be shorter than the first time period. If, for example, the path leads from/to an entrance/exit of a region, it may be assumed that a movement of the occupant in the first direction corresponds to the occupant entering the region, and that the region should therefore be illuminated. It may also be assumed that a movement of the occupant in the second direction corresponds to the occupant soon leaving the region, and that the region need not to be illuminated for more than a short additional period of time.

In some embodiments, the controller may be configured to estimate a net movement of occupants over time along the path in a first direction. The controller may for example estimate the net movement of occupants by subtracting an estimated number of occupants moving along the path in a second direction opposite to the first direction from an estimated number of occupants moving along the path in the first direction. The controller may operate the light source in an off-state if the estimated net movement of occupants over time along the path in the first direction is below a predefined threshold value. The threshold value may be a predefined value, or the threshold value may be calculated by the controller itself based on one or more criteria. It may for example be assumed that the path leads across a hallway leading to/from a larger region, and that tracking the net movement of occupants across the hallway may allow to estimate the number of occupants still present within the larger region. It may for example be determined that there are no more occupants present in the larger region, and that the larger region therefore no longer requires illumination. The predefined value may for example be zero in order to estimate when the larger region is empty.

In some embodiments, the lighting device and the sensor may be adapted to be arranged in a room such that movement along the path in a first direction corresponds to the occupant entering the room and movement along the path in a second direction corresponds to the occupant exiting the room.

The present disclosure relates to all possible combinations of features recited in the claims. Further objects and advantages will be described below by means of exemplifying embodiments.

BRIEF DESCRIPTION OF THE DRAWINGS

Exemplifying embodiments will be described below with reference to the accompanying drawings, in which.

Figure 1:
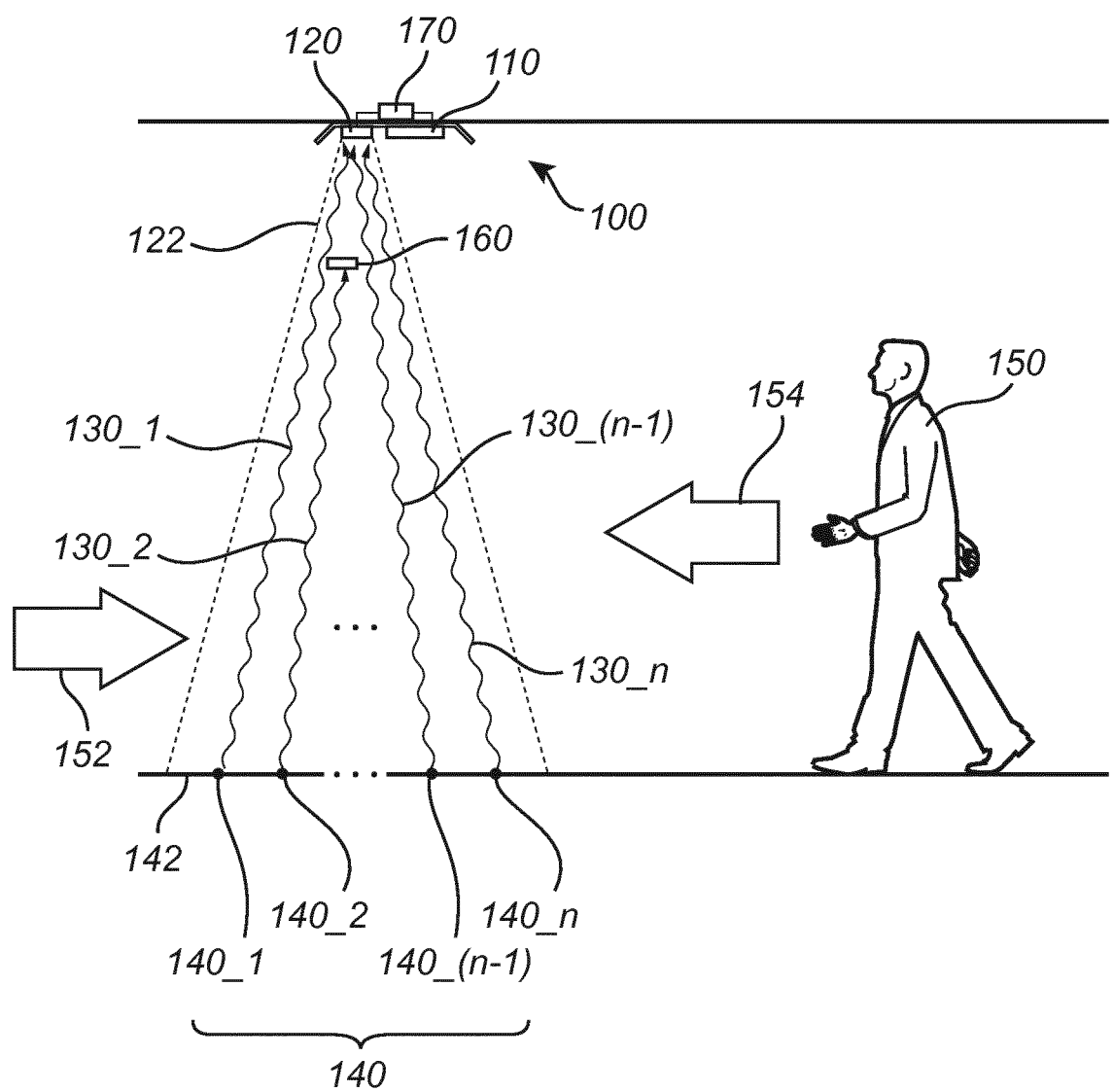
FIG. 1 schematically illustrates a lighting device according to embodiments of the present disclosure.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested. As illustrated in the figures, the sizes of elements and regions may be exaggerated for illustrative purposes and, thus, are provided to illustrate the general structures of the embodiments.

DETAILED DESCRIPTION OF THE EMBODIMENTS

Exemplifying embodiments will now be described more fully hereinafter with reference to the accompanying drawings. The drawings show currently preferred embodiments, but the invention may, however, be embodied in many different forms and should not be construed as limited to the embodiments set forth herein; rather, these embodiments are provided for thoroughness and completeness, and fully convey the scope of the present disclosure to the skilled person.

With reference to FIG. 1, a lighting device according to some embodiments is described in the following.

FIG. 1 schematically illustrates a lighting device 100. The lighting device 100 includes a light source 110 for emitting light, such that the lighting device 100 may be utilized to illuminate for example a room or an outdoor space. The lighting device 100 may for example be mounted in a ceiling, on a wall, or on any other suitable structure. The light source 110 may for example include one or more fluorescent light bulbs or tubes, one or more incandescent light bulbs or tubes, one or more light emitting diodes, and/or combinations thereof. It is envisaged that the light source 110 may be powered from e.g. the main grid or from one or more batteries.

The lighting device 100 includes a sensor 120. The sensor 120 has a field of view (FOV) 122 in which the sensor 120 may detect infrared radiation $130\_1, 130\_2, \ldots, 130\_(n-1)$, $130\_n$ from a plurality of locations 140 along a path 142 within the FOV 122 of the sensor 120, and the sensor may output a signal (not illustrated) which may indicate that an occupant 150 is present in the FOV 122 of the sensor 120 at any one of plurality of locations 140.

In FIG. 1, the plurality of locations 140 is, for illustrative purposes, shown as a set of discrete locations (or points) $140\_1, 140\_2, \ldots, 140\_(n-1), 140\_n$. It is also envisaged that the locations $140\_1, 140\_2, \ldots, 140\_(n-1), 140\_n$ may each represent a finite area in space, and/or that the locations $140\_1, 140\_2, \ldots, 140\_(n-1), 140\_n$ may form a continuum. If, for example, the occupant 150 is present at the location $140\_(n-1)$, infrared radiation $130\_(n-1)$ emitted by the occupant 150 may be detected by the sensor 120, and the sensor may output the signal indicating the presence of the occupant 150 at one of the plurality of locations 140.

The lighting device 100 further includes at least one attenuation element 160. The at least one attenuation element 160 is arranged between the location $140\_2$ and the sensor 120, so as to block or attenuate infrared radiation $130\_2$, which is emitted by e.g. an occupant located at the location $140\_2$, before it reaches the sensor 120. In relation to the FOV 122 of the sensor 120, the at least one attenuation element 160 is arranged such that if the occupant 150 moves along the path 142, the signal output from the sensor 120 is indicative of a direction of movement of the occupant 150 along the path 142. The signal output by the sensor 120 may for example indicate that the occupant 150 is moving along the path 142 in a first direction indicated by the arrow 152, or that the occupant 150 is moving along the path 142 in a second direction indicated by the arrow 154. Here, the first direction is opposite to the second direction.

The lighting device 100 also includes a controller 170. The controller 170 is arranged to receive the signal output from the sensor 120, and to control the light source 110 based on the direction of movement of the occupant 150 provided by or derived from the signal output from the sensor 120.

The sensor 120 may for example be a passive infrared sensor (a PIR sensor), i.e. a sensor including a pyroelectric material.

Figure 2:
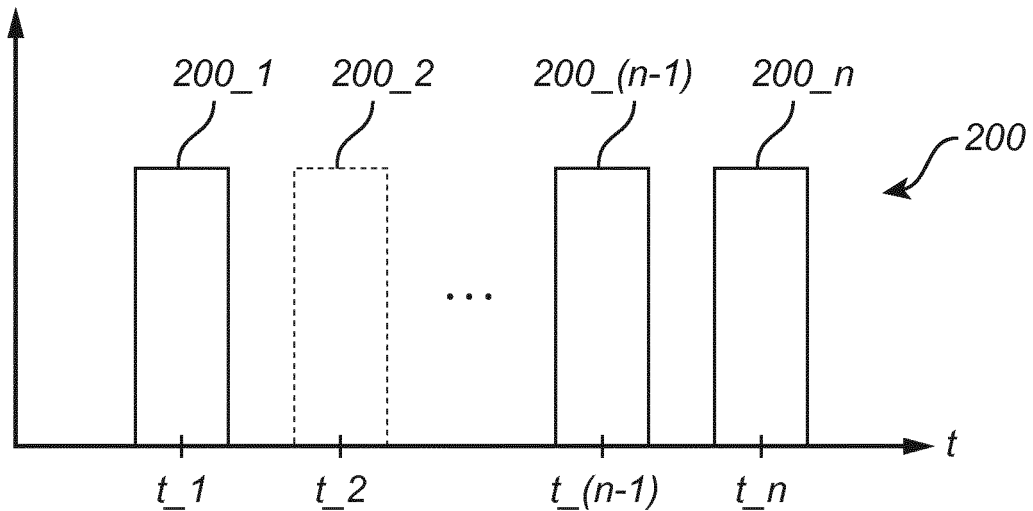
FIG. 2 schematically illustrates signals output by a sensor in a lighting device according to embodiments of the present disclosure.
Figure 2:
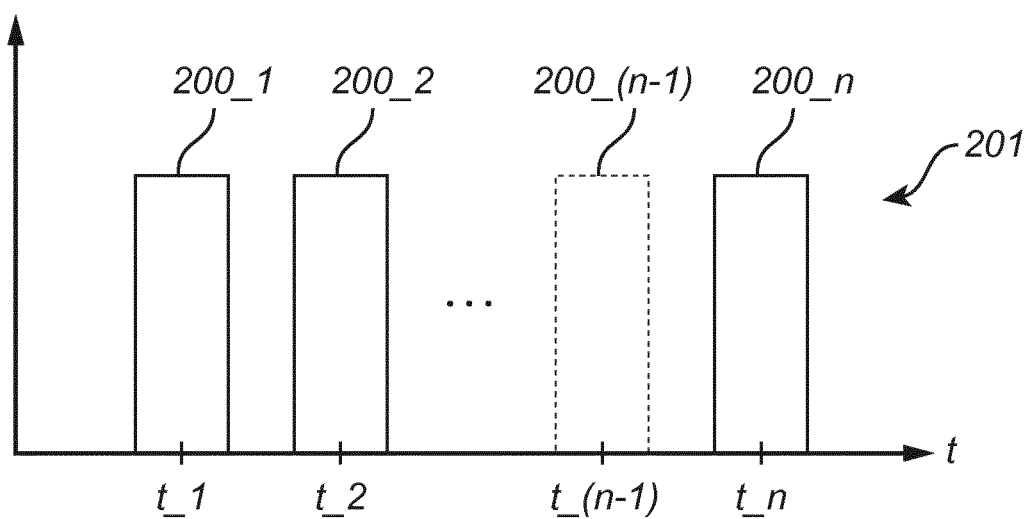

FIG. 2 schematically illustrates signals 200 and 201 which may be output by a sensor when an occupant moves within the field of view of the sensor. With reference to FIG. 2, and also to FIG. 1, the determining, based on such signals, of a direction of movement of an occupant along the path will now be described in more detail in what follows.

If the occupant 150 moves along the path 142 in the first direction, indicated by the arrow 152, it may be assumed that the occupant will enter the FOV 122 of the sensor 120 at the location $140\_1$ at a corresponding time $t\_1$, and that the occupant 150 would subsequently visit the remaining locations $140\_2, \ldots, 140\_(n-1), 140\_n$ at corresponding times $t\_2, \ldots, t\_(n-1), t\_n$. At each location, the occupant 150 would emit infrared radiation $130\_1, 130\_2, \ldots, 130\_(n-1)$, $130\_n$. If the infrared radiation reaches the sensor 120, the signal 200 output by the sensor 120 would contain a corresponding part $200\_1, 200\_2, \ldots, 200\_(n-1), 200\_n$ indicating that the occupant 150 was present within the FOV 122 of the sensor 120 at one of the plurality of locations 140 at the corresponding time $t\_1, t\_2, \ldots, t\_(n-1), t\_n$. However, since the at least one attenuation element 160 is arranged between the location 1402 and the sensor 120, the infrared radiation 1302 would be blocked or attenuated by the at least one attenuation element 160 before reaching the sensor 120, and the part $200\_2$ would therefore be missing from the signal 200 output by the sensor 120.

If the occupant 150, instead, were to move along the path 142 in the second direction, indicated by the arrow 154, it may be assumed that the occupant would instead enter the FOV 122 of the sensor 120 at the location $140\_n$ at the corresponding time $t\_1$. The occupant 150 would then subsequently visit the locations $140\_(n-1), \ldots, 140\_2$, $140\_1$ at the corresponding times $t\_2, \ldots, t\_(n-1), t\_n$. Due to the at least one attenuation element 160, the infrared radiation $130\_2$ emitted by the occupant 150 at $t\_(n-1)$ would be blocked or attenuated before reaching the sensor 120, and the signal 201 output by the sensor 120 would therefore instead miss the part 200_(n−1) at t_(n−1).

From the two signals 200 and 201, it is apparent that the direction of movement of the occupant 150 along the path 142 may be determined. As the location of the at least one attenuation element 160 relative to the FOV 122 of the sensor 120 is known, it may be determined that the signal 200 corresponds to a movement in the first direction 152, and that the signal 201 corresponds to a movement in the second direction 154. Phrased differently, the at least one attenuation element 160 may be arranged such that a movement of the occupant 150 in the first direction would generate a different output signal than a movement of the occupant 150 in the second direction.

This may be achieved for example by arranging the at least one attenuation element 160 asymmetrically with respect to the FOV 122 of the sensor 120. In the illustrative example in FIG. 1, arranging the at least one attenuation element 160 such that it equally blocks or attenuates infrared radiation 130_2, 130_(n−1) emitted from locations 140_2 and 140_(n−1) would for example not correspond to an asymmetrical arrangement of the at least one attenuation element 160, as the signals 200 and 201 would then be equal and independent of the direction of movement of the occupant 150 along the path 142.

More generally, and applicable to all embodiments of the present disclosure, the exact arrangement of the at least one attenuation element may be further influenced by the location of the sensor and the lighting device within e.g. a room in which the lighting device is arranged (or arrangeable), and also by the path or paths along which an occupant may be expected to move. The path and/or paths along which a movement of an occupant (or occupants) may be relevant may for example be decided in advance, and the arrangement of the lighting device within the room, the arrangement of the sensor within the lighting device, and the arrangement of the at least one attenuation element with respect to the sensor, the field of view of the sensor and the path or paths may be decided accordingly. The arrangement of the at least one attenuation element allows for the sensor to output a signal that, if an occupant walks along a relevant path in one direction, is different from a signal which would be output if the occupant instead walked along the relevant path in the opposite direction. The output signal may then be indicative of the direction of movement of the occupant along the path.

It should be noted that a lighting device, such as the lighting device 100, in accordance with the present disclosure may allow to determine a direction of movement of an occupant along a path using only a single sensor (or a single sensor element). This presents a difference when compared to e.g. a traditional PIR sensor in which multiple (e.g. two) sensor elements are coupled together in a differential fashion. In a differentially coupled sensor pair, direction of motion may be determined by studying the phase information of the signal, but with the additional cost of needing an extra sensor (or sensor element) plus the differential coupler itself. With a lighting device according to the present disclosure, a single sensor (element) may be sufficient as the at least one attenuation element will make the signal asymmetric (at least with respect to time) in such a way that the direction of movement of the occupant along the path may be determined.

If the at least one attenuation element 160 does not completely block infrared radiation from reaching the sensor 120 from one or more locations, it is envisaged that the corresponding part of the signals 200 and 201 is not completely missing, but instead has a reduced amplitude in the regions which are illustrated as missing in FIG. 2. As such, it would still be possible to identify which regions that have been affected by the at least one attenuation element 160.

As mentioned earlier herein, the illustration of the plurality of locations 140 as the discrete locations/points 140_1, 140_2, . . . , 140_(n−1), 140_n is for illustrative purposes only. It is envisaged that the points may for example be continuously distributed in space, such that they together form a continuous path. The corresponding signals 200 and 201 from the sensor 120 would then also be continuous, but the at least one attenuation element 160 would still cause at least a reduction of signal amplitude when the infrared radiation is emitted from locations which are blocked or attenuated by the at least one attenuation element 160. For example, for an infinite amount of locations along the path 142, the signals 200 and 201 would be continuous and have a reduced amplitude at least in a region corresponding to the occupant 150 moving at or in proximity to the location 140_2, as this location (or area) is blocked or attenuated by the at least one attenuation element 160.

Figure 3:
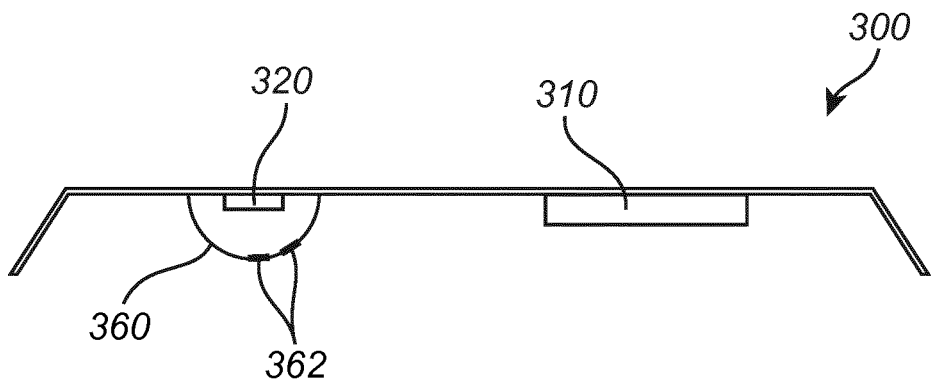
FIG. 3 schematically illustrates a lighting device according to embodiments of the present disclosure, and FIG. 4 schematically illustrates a lighting device according to embodiments of the present disclosure.
Figure 4:
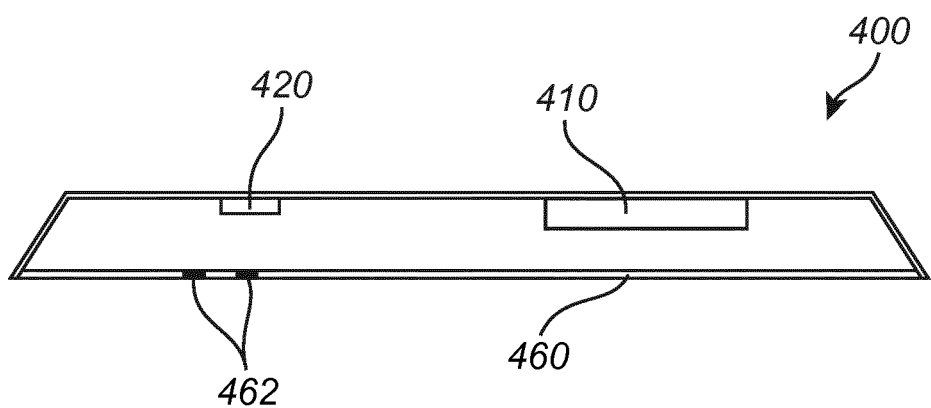
Figure 4:

With reference to FIGS. 3 to 4, further embodiments of a lighting device will now be described in what follows.

FIG. 3 schematically illustrates a lighting device 300. The lighting device 300 includes a light source 310 for emitting light and a sensor 320 for detecting infrared radiation as described earlier. The lighting device 300 includes a lens 360 which is arranged to direct infrared light towards the sensor 320. The lens 360 may for example be shaped like a hemisphere, or at least consist of multiple facets which are joined together in a shape resembling a hemisphere. It is also envisaged that the lens 360 may be of a Fresnel type, and/or that the lens 360 e.g. may be flat or substantially flat.

The lighting device 300 further includes at least one attenuation element 362 which may block or attenuate infrared light from reaching the sensor 320 from some directions. The at least one attenuation element 362 forms part of the lens 360, and may be created e.g. by modifying the lens 360. The lens 360 may be of a plastic material, and by using means of a digital manufacturing process, such as e.g. the heated nozzle of a 3D printer, or the heating laser for a lithographic process, regions of the lens 360 may be heated and melted such that their optical properties are altered, thereby creating the at least one attenuation element 362. It is also envisaged that the at least one attenuation element 362 may be created by adding a blocking or attenuating (for infrared light) structure as one or more additional layers to the lens 360.

The lens 360 may also be "printed", using for example a heated stencil/press-on-mold in order to achieve a desired lens pattern. The lens 360 may for example consist of multiple Fresnel lens segments. Molds for the different curvatures need to be produced only once and the different segments may thereafter be stitched together. The matching mold of each segment may be mounted as a tool on e.g. a 3D-printer or a CNC machine. Then, a suitable (IR-transparent, round, etc.) pre-lens may be finalized into the lens 360. The heated mold may be pressed onto the pre-lens in order to deform its surface into the desired shape. Placing the mold on different locations may result in different patterns of the at least one attenuation element, as desired. Other methods of fabricating the lens 360 and/or the at least one attenuation element 362 may also be envisaged.

The lighting device 300 further includes a controller (not shown) which is arranged to receive the signal output from the sensor 320 and to control, based on the signal and the determined direction of movement of the occupant, the light source 310.

FIG. 4 schematically illustrates a lighting device 400. The lighting device 400 includes a light source 400 for emitting light, and a sensor 420 for detecting infrared radiation as described earlier. The lighting device 400 includes a cover plate 460 which is arranged between the sensor 420 and at least one location 440 of a plurality of locations along a path (not shown) within the field of view (not shown) of the sensor. The lighting device 400 further includes at least one attenuation element 462 which form part of the cover plate 460. The at least one attenuation element 462 is arranged such that it may block or attenuate infrared radiation before it reaches the sensor 420 from the at least one location 440.

The cover plate is also arranged between the light source 410 and the at least one location 440 (the at least one location 440 lies along a path which is within the field of view of the sensor 420). The cover plate 460 is made such that it is transparent or translucent to visible light emitted (e.g. in the range 400-700 nm) by the light source 410 and also to infrared radiation (e.g. in part or all of the range 7-14 μm). The at least one attenuation element 462 does not affect the visible light emitted by the light source 410. Further, the at least one attenuation element 462 may be invisible (e.g. transparent for light falling within the range 400-700 nm) to for example a viewer located in e.g. a room wherein the lighting device 400 is arranged. The aesthetics of the lighting device 400 are thus not influenced by the sensor 420 and the at least one attenuation element 462. The at least one attenuation element 462 blocks or attenuates infrared light in all or part on 7-14 μm.

The cover plate 460 may for example be at least partly made of polyethylene. The at least one attenuation element 462 may include a material such as a polymer or a polymerizable molecule, such as for example an acrylate or an epoxide.

As defined herein, a "lighting device" may include a base, on or to which the light source, the sensor and the controller are attached. It is envisaged that the base may be adapted to for example mount the lighting device in a ceiling, on a wall or on any other suitable support structure.

A "controller" may for example include a microprocessor and/or other electrical circuits or devices which may take as an input the signal output by the sensor, or a signal generated based on the signal output by the sensor. The controller may then use the input signal to provide e.g. a controller output signal which may control the operation of the light source of the lighting device. The controller output signal may for example be a pulse-width modulation (PWM) signal, an analog signal or a digital signal, and the controller output signal may for example control a relay which switches power supply to the light source on and off based on the controller output signal. The controller output signal may also, for example, directly power the light source. Other variants of controllers, implemented in software, hardware or as a combination of both software and hardware, are also envisaged. It may, for example, be envisaged also that the controller just directly transfers the input signal to the controller output signal, and that the light source is controlled directly by the signal output from the sensor. In other embodiments, it is envisaged that the controller first performs one or more logic steps/operations before outputting the controller output signal to the light source based on the signal output from the sensor.

As also defined herein, an "attenuation element" may be included in the lighting device as part of e.g. a lens covering the sensor, or as part of a cover plate used as e.g. a diffusor or protector for the light source and/or the sensor. It is also envisaged that an attenuation element may be included in the lighting device by other means, such as for example by including the attenuation element on or at the sensor itself, etc. The attenuation element may for example be produced on an otherwise IR-transparent film and positioned on the sensor. If multiple attenuation elements are used, all or many of the elements may be produced on the same film.

Independent of how the at least one attenuation element is provided, the at least one attenuation element should be provided and arranged such that it breaks an otherwise present symmetry in a signal output by the sensor when an occupant is moving across the field of view of the sensor along a certain path. The certain path, or a plurality of certain paths, along which the direction of movements should be determined may be defined in advance, and the at least one attenuation element may be provided and arranged accordingly. For example, if the path of interest goes from right to left between the corners of a rectangular room, and if the lighting device (or at least the sensor) is to be positioned in the middle of the ceiling of this room, the at least one attenuation element should be placed asymmetrically with respect (or relative to) the middle of the ceiling and the path. By so doing, an occupant walking from left to right (at a certain speed) will make the sensor output a signal which is different compared to a signal output by the same sensor if the occupant was instead walking from right to left (at the same certain speed). As a contrary example, if a single attenuation element is used, and if this single attenuation element is instead arranged symmetrically in the middle of the ceiling, the signal output by the sensor would be the same independently of the direction of movement/walking of the occupant. Likewise, if e.g. two attenuation elements are used, but if these are arranged symmetrically around the middle of the ceiling and with respect to the path (i.e. right between the middle of the ceiling and one of the respective corners between which the path extends), the signals would also be the same and the direction of movement of the occupant would not be determinable.

By selecting the position of the lighting device and the sensor within e.g. a room, by defining one or more certain paths within the room, and by accordingly arranging the at least one attenuation element, the lighting device according to the present disclosure makes it possible to determine a direction of movement of an occupant in the room at least along the defined one or more paths, and to provide an improved control of the light source of the lighting device based on these determined directions of movement of the occupant. The light source may be controlled not only based on the presence of an occupant, but also on whether this occupant is for example entering or leaving the room, or walking to or from e.g. a door of the room. This may offer an improved lighting experience for the user, and also an improved lighting in terms of both cost and maintenance. In addition, by not requiring the use of more than a single sensor, the lighting device including the occupancy sensor may be fabricated more cost effectively. Also, by integrating the occupancy sensor within the lighting device itself, the improvement of the lighting device may be achieved without sacrificing its aesthetical appearance.

Although features and elements are described above in particular combinations, each feature or element may be used alone without the other features and elements or in various combinations with or without other features and elements.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A lighting device comprising:
   a light source for emitting visible light;
   a sensor configured to detect infrared radiation from a plurality of locations along a path in a field of view of the sensor and to output a signal indicative of a presence of an occupant along said path;
   at least one attenuation element, arranged between at least one location of said plurality of locations and the sensor so as to attenuate or block infrared radiation emitted from said at least one location before it reaches the sensor, wherein the at least one attenuation element is further arranged in relation to the field of view for the signal output from the sensor to indicate, when an occupant is moving along the path, a direction of movement of the occupant along said path, and
   a controller arranged to receive the signal output from the sensor and to control the light source based on said direction of movement of the occupant,
   wherein the lighting device further comprises:
   a lens for directing infrared light towards the sensor, and
   a cover plate arranged between the at least one location of said plurality of locations and the sensor, and also arranged between the at least one location and the light source, wherein the cover plate is transparent or translucent to said visible light, wherein the at least one attenuation element forms part of the cover plate, and wherein outside, or away from, the attenuation element, the cover plate is at least partly transparent to infrared radiation.

2. The lighting device of claim 1, wherein the at least one attenuation element is a heat-stenciled element, a press-on-molded element.

3. The lighting device of claim 1, wherein the cover plate is made of polyethylene.

4. The lighting device of claim 1, wherein the at least one attenuation element comprises a material selected from polymers or polymerizable molecules.

5. The lighting device of claim 1, wherein the at least one attenuation element includes a material selected from the group of polyesters, polyacrylates, vinyl polymers, and acrylonitrile butadiene styrene.

6. The lighting device of claim 1, wherein the at least one attenuation element is arranged asymmetrically with respect to the field of view of the sensor.

7. The lighting device of claim 1, wherein the light source comprises a light emitting diode, LED.

8. The lighting device of claim 1, wherein the controller is configured to set or retain the light source in an on-state if it is detected that the occupant moves along the path in a first direction, and/or to set or retain the light source in an off-state if it is detected that the occupant moves along the path in a second direction opposite to the first direction.

9. The lighting device of claim 1, wherein the controller is configured to set or retain the light source in an off-state after a lapse of a first time period starting when it is detected that the occupant moves along the path in a first direction, and/or to set or retain the light source in an off-state after a lapse of a second time period starting when it is detected that the occupant moves along the path in a second direction opposite to the first direction.

10. The lighting device of claim 1, wherein the controller is configured to estimate a net movement of occupants over time along the path in a first direction by subtracting an estimated number of occupants moving along the path in a second direction opposite to the first direction from an estimated number of occupants moving along the path in the first direction, and to operate the light source in an off-state if the estimated net movement of occupants over time along the path in the first direction is below a threshold value.

11. The lighting device of claim 1, wherein the lighting device and the sensor are adapted to be arranged in a room such that movement along the path in a first direction corresponds to the occupant entering the room and movement along the path in a second direction corresponds to the occupant exiting the room.

12. A lighting arrangement comprising at least a first lighting device and a second lighting device according to claim 1, wherein the controllers are communicatively coupled and configured to control the lighting devices based on directions of movements of occupants along a path in the field of view of the first sensor and along a path in the field of view of the second sensor.

* * * * *